United States Patent
Fecteau

(10) Patent No.: US 12,162,423 B2
(45) Date of Patent: Dec. 10, 2024

(54) AIRBAG MODULE WITH PRE-FOLD

(71) Applicant: JOYSON SAFETY SYSTEMS ACQUISITION LLC, Auburn Hills, MI (US)

(72) Inventor: Ryan Fecteau, Lake Orion, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 0 days.

(21) Appl. No.: 18/086,233

(22) Filed: Dec. 21, 2022

(65) Prior Publication Data
US 2023/0211749 A1 Jul. 6, 2023

Related U.S. Application Data

(60) Provisional application No. 63/295,408, filed on Dec. 30, 2021.

(51) Int. Cl.
*B60R 21/235* (2006.01)
(52) U.S. Cl.
CPC .. *B60R 21/235* (2013.01); *B60R 2021/23538* (2013.01)
(58) Field of Classification Search
CPC .............................. B60R 21/237; B60R 21/235
See application file for complete search history.

(56) References Cited

U.S. PATENT DOCUMENTS

| | | | | |
|---|---|---|---|---|
| 5,785,350 | A * | 7/1998 | Inoue | B60R 21/2338 280/730.2 |
| 8,628,111 | B2 * | 1/2014 | Sugimoto | B60R 21/237 280/739 |
| 8,840,134 | B2 * | 9/2014 | Lechelt | B60R 21/231 280/730.1 |
| 9,821,750 | B2 * | 11/2017 | Miura | B60R 21/237 |
| 10,065,594 | B2 * | 9/2018 | Fukawatase | B60R 21/233 |
| 10,589,707 | B2 * | 3/2020 | Zhang | B60R 21/2035 |
| 10,981,533 | B2 * | 4/2021 | Kobayashi | B60R 21/23138 |
| 10,994,691 | B2 * | 5/2021 | Wasilewska | B60R 21/231 |
| 11,027,691 | B2 * | 6/2021 | Nonoyama | B60R 21/231 |
| 2015/0367811 | A1 * | 12/2015 | Kobayashi | B60R 21/233 280/730.2 |

FOREIGN PATENT DOCUMENTS

DE 102016108613 B4 * 5/2016
JP 2023067361 A * 5/2023

* cited by examiner

*Primary Examiner* — Nicole T Verley
(74) *Attorney, Agent, or Firm* — Meunier Carlin & Curfman LLC

(57) ABSTRACT

An airbag module according to various implementations includes an inflatable cushion, an inflator, and a pre-fold. The inflatable cushion includes a first panel and a second panel, each of the first and second panels including an outer surface. The first panel and the second panel are folded to form a first tuck and a second tuck. A protruding portion of the first and second panels is then folded into or adjacent to the first or second tuck to form the pre-fold.

5 Claims, 7 Drawing Sheets

AIRBAG MODULE WITH PRE-FOLD

CROSS REFERENCE TO RELATED APPLICATIONS

This application claims priority to U.S. Provisional Application No. 63/295,408, filed Dec. 30, 2021, entitled "AIRBAG MODULE WITH PRE-FOLD," which is incorporated herein by reference in its entirety.

TECHNICAL FIELD

The present disclosure relates to safety devices for passenger vehicles. In particular, the disclosure relates to a curtain airbag module with a pre-fold.

BACKGROUND

For curtain airbags, when the required coverage zone in a vehicle is longer than the allotted storage size in the vehicle, a curtain airbag that sufficiently meets the coverage zone will need a "pre-fold" before the final fold. Pre-folds can include a simple fold, inboard (directed toward the inside of the vehicle) or outboard (directed toward the outside of the vehicle), and when a very large pre-fold is necessary there can be a "Z-fold" (large initial fold then a second fold half the length back on itself). This Z-fold is necessary to prevent one large fold that would go too far inboard or outboard during airbag deployment, thus resulting in poor performance. Other pre-folds include a tuck fold, but a tuck fold can require the elimination of internal airbag chambers to allow an area to tuck into, which limits the available size of this kind of pre-fold. Also possible are "post-folds" which include a simple fold or Z-fold of an end of a finally folded airbag module, but this results in a significantly larger storage size that can have trouble fitting into the allotted storage space in many vehicles.

SUMMARY

Disclosed herein is a pre-fold that can be used on a curtain airbag module at the front or rear of the airbag module that allows a dramatic reduction in package length while still maintaining the desired airbag performance during deployment. The pre-fold includes a small tuck fold that leaves a portion of the airbag protruding out from the tuck. This portion protruding from the tuck is more manageable and can be folded over inboard or outboard or into the tuck. During deployment, the disclosed pre-fold unfolds almost immediately with little effect on performance, and the storage size of the airbag module is effectively limited.

Various implementations include an airbag module for protecting an occupant of a vehicle comprising an inflatable cushion and an inflator. The inflatable cushion comprises a first panel and a second panel, the first panel comprising an outer surface and the second panel comprising an outer surface. The inflator provides an inflation gas for inflating the inflatable cushion. A first portion of the outer surface of the first panel is placed adjacent a second portion of the outer surface of the first panel to form a first tuck and a first portion of the outer surface of the second panel is placed adjacent a second portion of the outer surface of the second panel to form a second tuck. A third portion of the outer surface of the first panel and a third portion of the outer surface of the second panel are folded about a fold line so that the third portion of the outer surface of the second panel is adjacent a fourth portion of the outer surface of the second panel. In other implementations, the third portion of the outer surface of the first panel and the third portion of the outer surface of the second panel are folded about the fold line so that the third portion of the outer surface of the first panel is adjacent a fourth portion of the outer surface of the first panel.

In other implementations, the third portion of the outer surface of the first panel and the third portion of the outer surface of the second panel are folded about the fold line so that the third portion of the outer surface of the second panel is adjacent the first portion of the outer surface of the second panel and the third portion of the outer surface of the first panel is adjacent the second portion of the outer surface of the second panel. In other implementations, the third portion of the outer surface of the first panel and the third portion of the outer surface of the second panel are folded about the fold line so that the third portion of the outer surface of the first panel is adjacent the first portion of the outer surface of the first panel and the third portion of the outer surface of the second panel is adjacent the second portion of the outer surface of the first panel.

BRIEF DESCRIPTION OF THE DRAWINGS

The drawings are merely exemplary to illustrate steps, structure, and certain features that can be used singularly or in combination with other features. The disclosure should not be limited to the implementations shown.

DETAILED DESCRIPTION

The present disclosure relates to safety devices for passenger vehicles. The devices, systems, and methods disclosed herein provide for an airbag module comprising an inflatable cushion comprising a pre-fold to provide for more efficient folding operations and airbag performance. The airbag module may be installed into a vehicle roof rail for protecting an occupant of the vehicle during a side impact and/or rollover accident. The inflatable cushion comprises a first panel having an outer surface and a second panel having an outer surface. The first panel and the second panel are coupled to each other by a seam, and a tuck fold is formed in both the first panel and the second panel. A non-tucked portion of the first panel and second panel is then folded inboard of, outboard of, or into one of the tuck folds.

Figure 1:
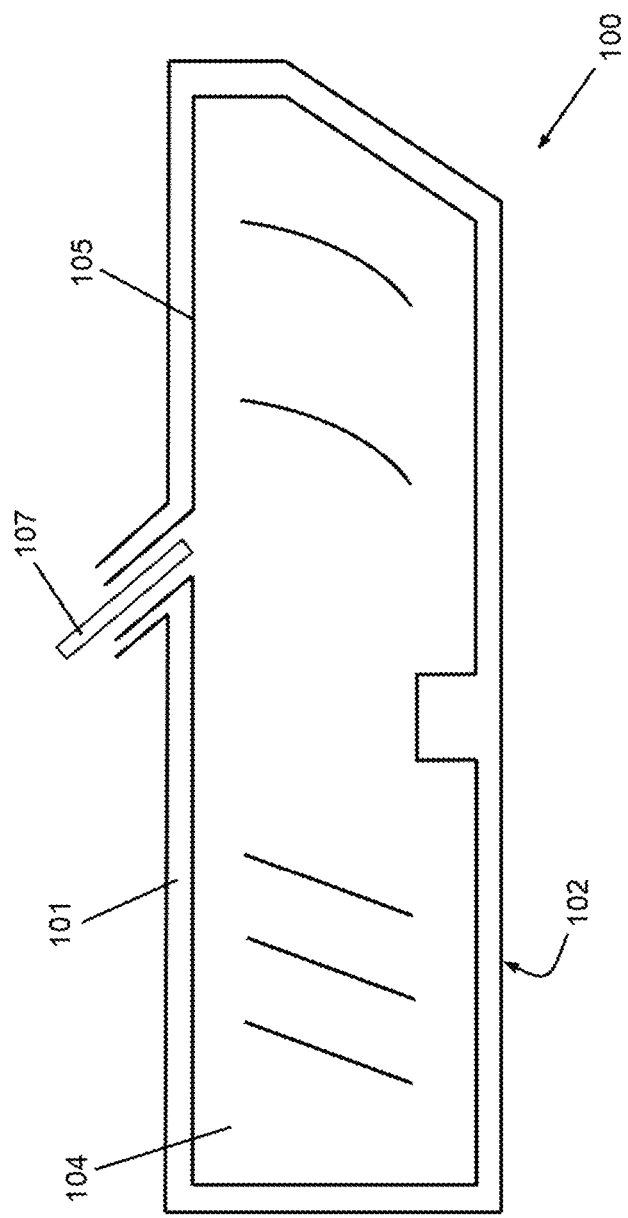
FIG. 1 is side view of an unfolded airbag module.

As shown in FIG. 1, an airbag module 100 of a first implementation comprises an inflatable cushion 104 and an inflator 107. The inflatable cushion 104 comprises a first panel 101 and a second panel 102. The first panel 101 and second panel 102 are formed separately and coupled together with a seam 105 to encapsulate an inflation chamber 110 within the inflatable cushion 104. The first panel 101 and second panel 102 may be made from airbag fabric (e.g., woven nylon or woven polyester), and may be coated, for example with silicone, to better prevent inflation gas leakage from the inflation chamber 110. The seam 105 may comprise stitching, for example nylon thread. In other implementations, the seam may comprise polyester thread. In other implementations, the seam may comprise an adhesive or silicone bead. In other implementations, the first panel and the second panel may be formed integrally, for example using one-piece weaving technology, and therefore have no seam.

Inflator 107 provides inflation gas into the inflation chamber 110 for inflating the inflatable cushion 104 during an accident. The inflator 107 is triggered by an electrical signal from an electronic control unit (ECU) within the vehicle when one or more crash sensors detect an accident. The inflator 107 may be a pyrotechnic gas generator. In other implementations, the inflator may be a pressurized stored gas inflator or a hybrid inflator comprising both pyrotechnics and pressurized stored gas.

Figure 2:
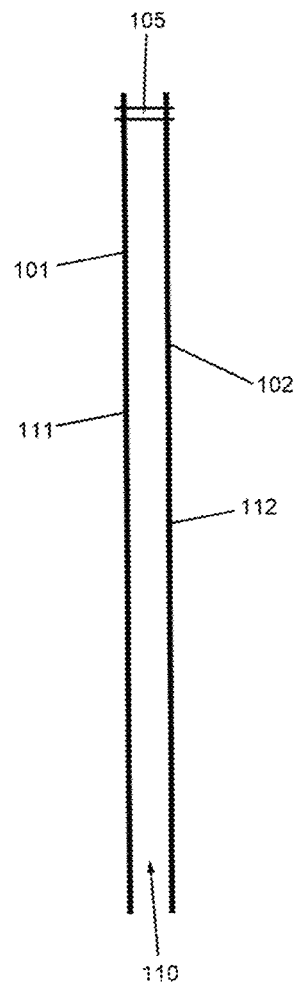
FIG. 2 is a view of a first panel and a second panel of the unfolded airbag module of FIG. 1 laid upon each other and attached with a seam.
Figure 3:
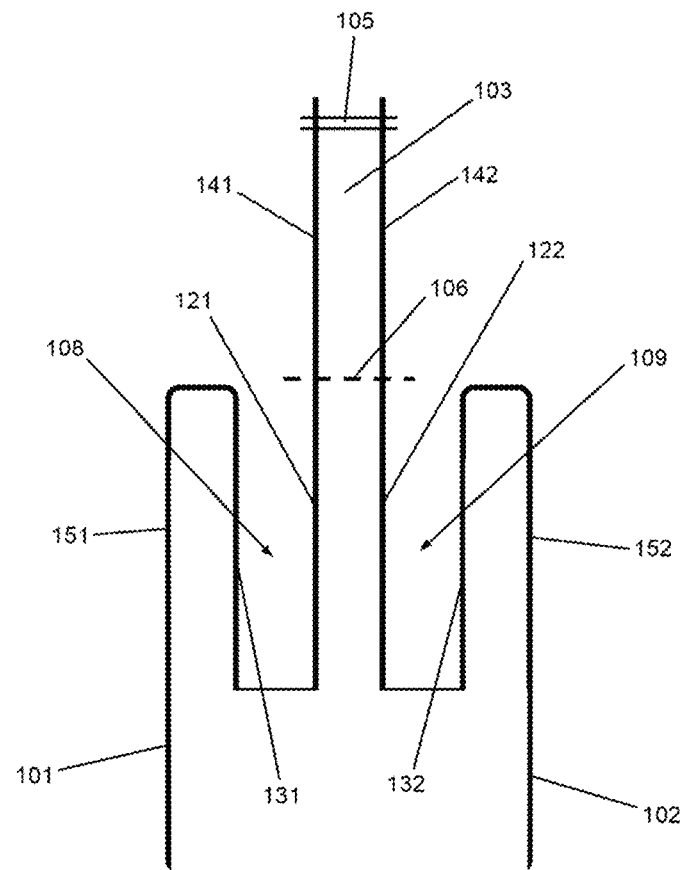
FIG. 3 is a view of the first and second panels of FIG. 2 with a tuck fold in each panel.

Referring now to FIGS. 2-3, the first panel 101 comprises an outer surface 111 and the second panel 102 comprises an outer surface 112. The outer surface 111 of the first panel 101 comprises a first portion 121, a second portion 131, a third portion 141, and a fourth portion 151. Similarly, the outer surface 112 of the second panel 102 comprises a first portion 122, a second portion 132, a third portion 142, and a fourth portion 152. To form a first tuck 108, the outer surface 111 of the first panel 101 is pulled inward so that the first portion 121 and the second portion 131 are adjacent each other. To form a second tuck 109, the outer surface 112 of the second panel 102 is pulled inward so that the first portion 122 and the second portion 132 are adjacent each other. A protruding portion 103 comprises the third portion 141 of the first panel 101 and the third portion 142 of the second panel 102 and extends beyond a fold line 106.

Figure 4:
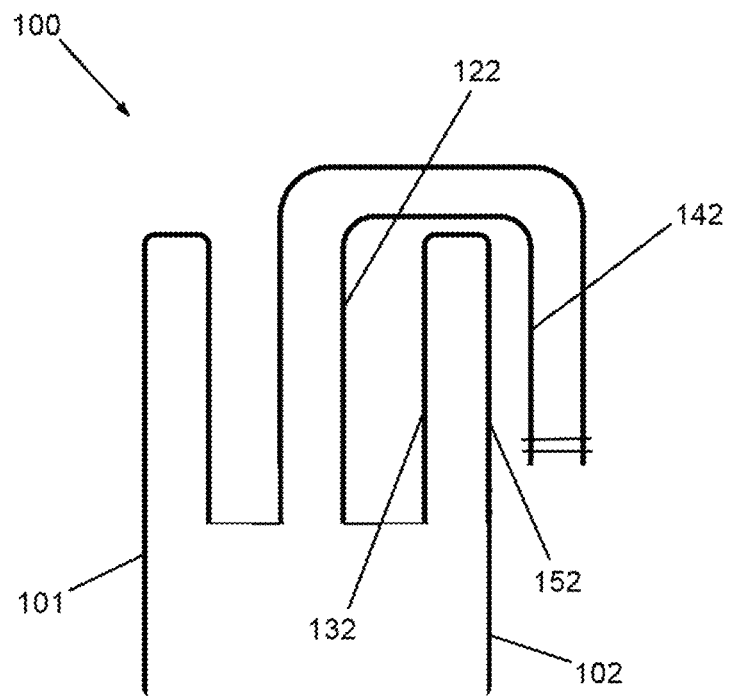
FIG. 4 is a view of a first implementation of the airbag module with a pre-fold.

The airbag module 100 shown in FIG. 4 comprises a finished pre-fold of a first implementation. To form the finished pre-fold, the protruding portion 103 is folded about the fold line 106 such that the third portion 142 of the outer surface 112 of the second panel 102 is adjacent the fourth portion 152 of the outer surface 112 of the second panel 102. The airbag module 100 can then be finally folded by, for example, roll folding or simple fold+roll folding the inflatable cushion 104 into a finished packaged size for installation into the vehicle.

Figure 5:
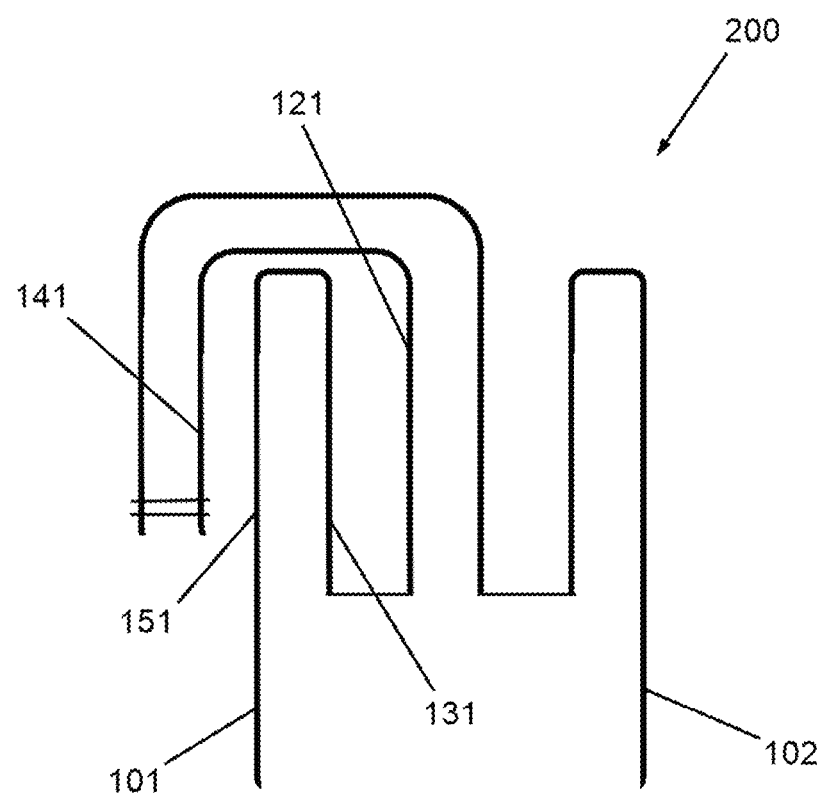
FIG. 5 is a view of a second implementation of the airbag module with a pre-fold.

The airbag module 200 shown in FIG. 5 comprises a finished pre-fold of a second implementation. To form the finished pre-fold, the protruding portion 103 is folded about the fold line 106 such that the third portion 141 of the outer surface 111 of the first panel 101 is adjacent the fourth portion 151 of the outer surface 111 of the first panel 101.

Figure 6:
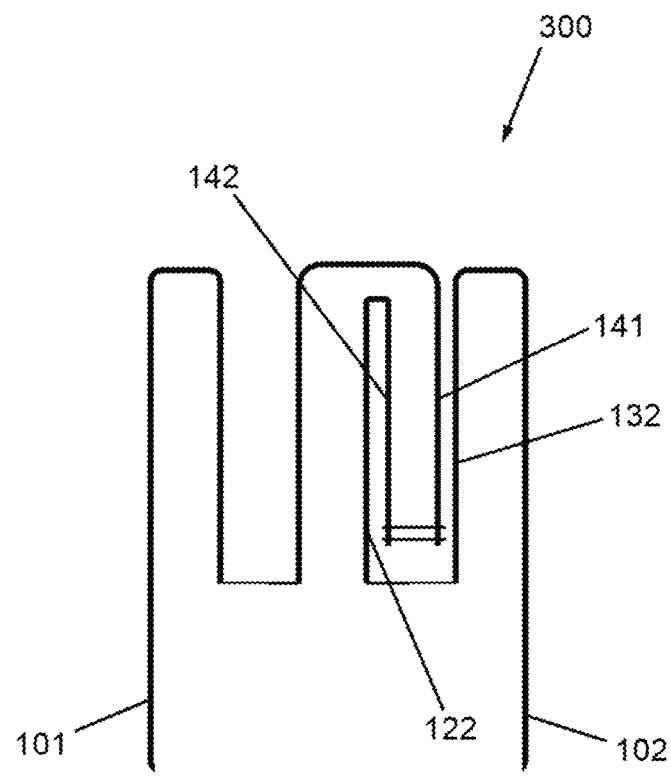
FIG. 6 is a view of a third implementation of the airbag module with a pre-fold.

The airbag module 300 shown in FIG. 6 comprises a finished pre-fold of a third implementation. To form the finished pre-fold, the protruding portion 103 is folded about the fold line 106 such that the third portion 142 of the outer surface 112 of the second panel 102 is adjacent the first portion 122 of the outer surface 112 of the second panel 102 and the third portion 141 of the outer surface 111 of the first panel 101 is adjacent the second portion 132 of the outer surface 112 of the second panel 102.

Figure 7:
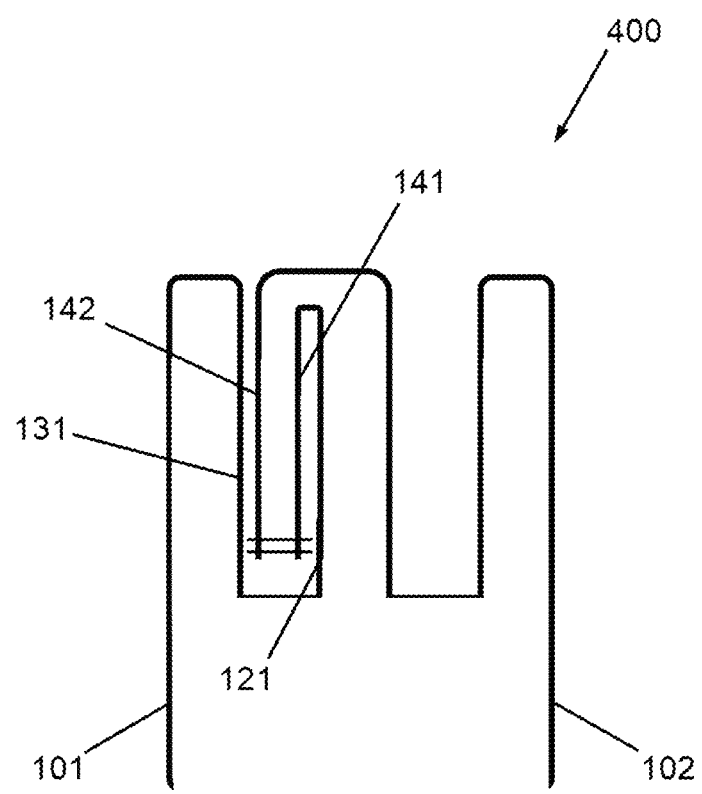
FIG. 7 is a view of a fourth implementation of the airbag module with a pre-fold.

The airbag module 400 shown in FIG. 7 comprises a finished pre-fold of a fourth implementation. To form the finished pre-fold, the protruding portion 103 is folded about the fold line 106 such that the third portion 141 of the outer surface 111 of the first panel 101 is adjacent the first portion 121 of the outer surface 111 of the first panel 101 and the third portion 142 of the outer surface 112 of the second panel 102 is adjacent the second portion 131 of the outer surface 111 of the first panel 101.

A number of implementations have been described. The description in the present disclosure has been presented for purposes of illustration but is not intended to be exhaustive or limited to the implementations disclosed. It will be understood that various modifications and variations will be apparent to those of ordinary skill in the art and may be made without departing from the spirit and scope of the claims. Accordingly, other implementations are within the scope of the following claims. The implementations described were chosen in order to best explain the principles of the airbag module and its practical application, and to enable others of ordinary skill in the art to understand the airbag module for various implementations with various modifications as are suited to the particular use contemplated.

The terminology used herein is for the purpose of describing particular implementations only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, operations, elements, and/or components, but do not preclude the presence or addition of one or more other features, operations, elements, components, and/or groups thereof.

What is claimed is:

1. An airbag module for protecting an occupant of a vehicle, the airbag module comprising:
   an inflatable cushion comprising a first panel and a second panel, the first panel comprising an outer surface and the second panel comprising an outer surface; and
   an inflator for providing an inflation gas for inflating the inflatable cushion;
   wherein a first portion of the outer surface of the first panel is placed adjacent a second portion of the outer surface of the first panel forming a first tuck;
   wherein a first portion of the outer surface of the second panel is placed adjacent a second portion of the outer surface of the second panel forming a second tuck; and
   wherein a third portion of the outer surface of the first panel and a third portion of the outer surface of the second panel are folded about a fold line so that the third portion of the outer surface of the second panel is adjacent the first portion of the outer surface of the second panel and the third portion of the outer surface of the first panel is adjacent the second portion of the outer surface of the second panel.

2. The airbag module of claim 1, wherein the inflator is selected from the group consisting of a pyrotechnic gas generator, a pressurized stored gas inflator, and a hybrid inflator.

3. The airbag module of claim 2, wherein the inflator is a pressurized stored gas inflator.

4. The airbag module of claim 1, wherein the first panel and second panel are coupled together via a seam.

5. The airbag module of claim 4, wherein the seam comprises stitching.

* * * * *